Feb. 27, 1951
W. J. BLAZEK
2,543,224
ADJUSTABLE REAMER
Filed Sept. 12, 1946
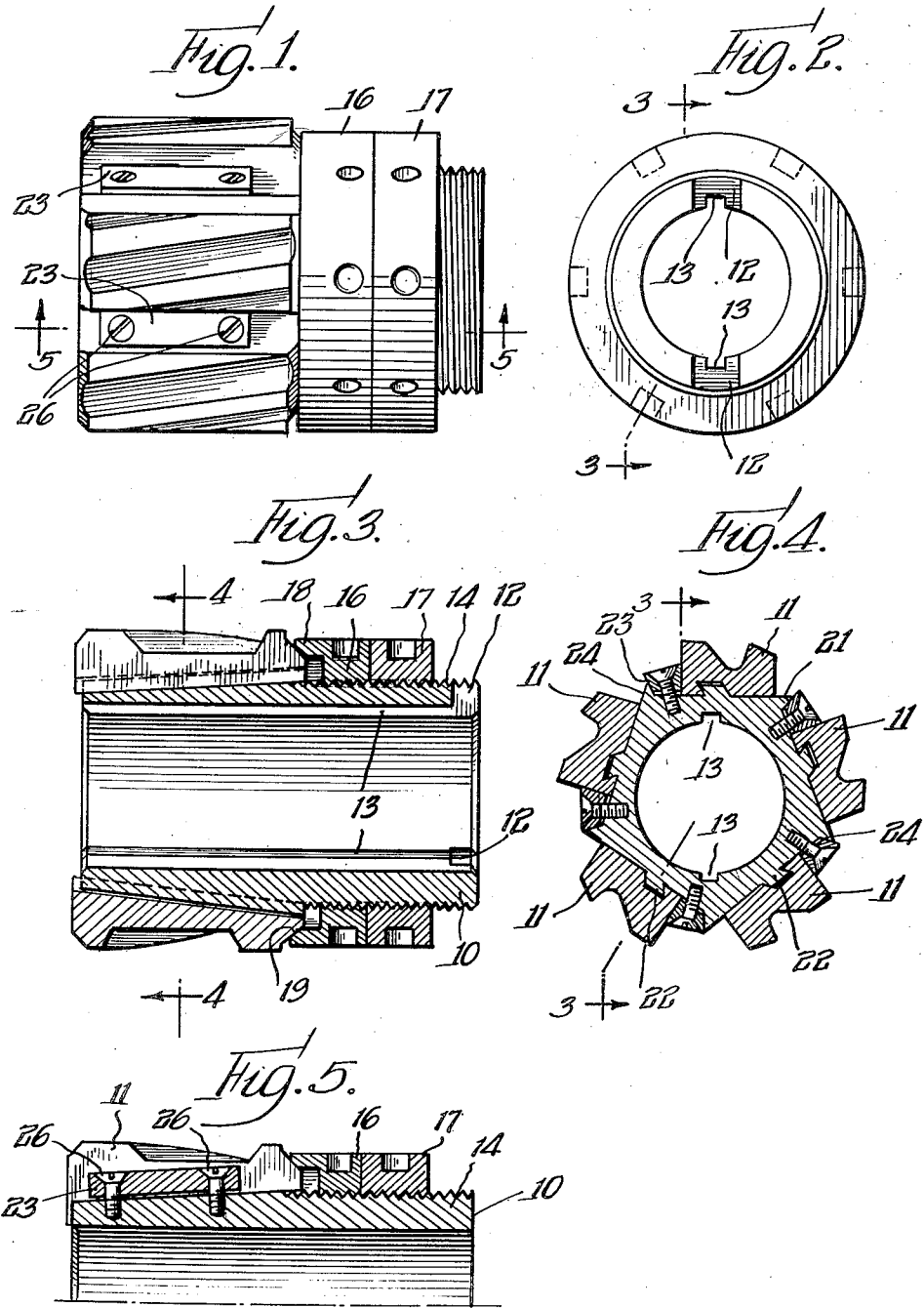
INVENTOR.
William J. Blazek
BY
McLaughlin & Wallenstein
Attys.

Patented Feb. 27, 1951

2,543,224

UNITED STATES PATENT OFFICE 2,543,224

ADJUSTABLE REAMER

William J. Blazek, New Lexington, Ohio, assignor to Lempco Products, Inc., Bedford, Ohio, a corporation of Ohio Application September 12, 1946, Serial No. 696,486

8 Claims. (Cl. 77—75)

My invention relates to reamers. It relates more in particular to a reamer such as a shell reamer having a plurality of adjustable and removable cutting members secured to the mandrel or shank by improved means.

The principal object of my invention is the provision of an improved reamer.

Another object is the provision of improved means for adjustably attaching the cutting segments to the shank of the reamer.

Still another object is the provision of a construction in which the cutting members are provided at only one end thereof with an annular retaining member in the nature of a collar or collar bearing nut so that the cutting members may be supported at any suitable point on the shank, including the very end thereof, and still have adequate support.

A further object is the provision of an improved reamer having improved operating qualities and one capable of production at relatively small cost.

Other objects and features of the invention will be apparent from a consideration of the detailed description which follows taken with the accompanying drawing wherein:

Fig. 1 is an elevational view;

Fig. 2 is an end view looking at the right-hand side of Fig. 1;

Fig. 3 is a sectional view taken on the line 3—3 of Fig. 2 (also of Fig. 4), looking in the direction of the arrows;

Fig. 4 is a transverse sectional view taken on the line 4—4 of Fig. 3; and

Fig. 5 is a partial longitudinal sectional view taken through one of the wedge shaped segment supporting members along the line 5—5 of Fig. 1.

Referring now to the drawing:

The reamer of my invention comprises a shank or mandrel 10 on which a plurality of cutting segments or blades 11 are secured. The shank can be a solid shank, but, preferably, is a shell as shown in the drawing and should have provision for attachment to a machine tool for turning. Any suitable connection may be used for the purpose and, for illustration purposes only, I show in the drawing a pair of end recesses 12 together comprising a key way and inner longitudinally extending recesses or key ways 13. This particular means for attachment to a driving mechanism is illustrative and other suitable chucking or attaching mechanism may be provided.

The outer portion of the shank or shell is provided with threads 14 for receiving a rear adjusting nut 16 and lock nut 17, the former provided with an annular blade engaging flange portion 18. The rear adjusting nut and blade engaging portion may be variously formed but it will be noted that the annular portion 18 is chamfered to engage the chamfered end portion 19 of the blades.

The exterior portion of the shank is provided with a plurality of flat blade supporting surfaces 21, five being shown in the drawing but any suitable number may be provided corresponding to the number of blades. It will be understood that in a shell reamer of this type the entire tool is of relatively great cross section and there will be a relatively large number of blades around the periphery of the shell and consequent blade engaging surfaces therefor. The surfaces 21 are inclined to the axis of the reamer (see Fig. 3), and are provided with longitudinally extending rhombic projections 22 engaging in correspondingly shaped recesses on the bottom face of the cutting segments or blades to form a hook-like driving engagement between the shank and the blades, and the slant and position of the projections 22 are so arranged that the blades will be driven during a reaming operation and will be caused to engage more tightly against the shank by reason of the camming action produced by the slanting character of the projections. The projections 22 are located forwardly of the center of each blade in order further to produce the effect described, namely, that the blade hugs the shank and is not apt to raise, chatter or dig into the work.

As a further support for the blades, I provide a plurality of wedge shaped blade retaining members 23, at least one for each blade, these members being wedged between one contiguous side portion of the blade and a forwardly facing extension 24 of the blade supporting portion of the shank. The blade retaining members 23 may be formed in various ways and have various dimensions, but, as shown in the drawings, I preferably make them at least a substantial portion of the length of the blades and hold them in position by retaining screws 26 placed at each end thereof. It is understood, of course, that the number of screws and location thereof may vary.

As shown particularly in Fig. 4, the wedge shaped blade retaining members 23 engage between one side face (the forward one) and a face of the extension or projection 24. It will be noted that the slant of that face of the projection 24 which is engaged by the blade retaining member 15 is approximately the same as the undercut of the forward face of the projection 22. Thus, it will be seen that all of each of the five faces of the shank can be milled in a single operation. While the angle of these surfaces may vary, I have found that approximately 60 degrees is satisfactory.

The sides of the blades 11 are substantially parallel to each other and substantially perpendicular to the bottom shank engaging surface thereof. Thus, there is a minimum of work required in finishing these blades so far as their side surfaces are concerned. Because of the position of the forward side surface of the blades, however, they do, in fact, have a slant with respect to a radial line drawn from the center of the shank to the point at which the forward edge of the blade engages the shank. The blade retaining members 23 can thus be made wedge shaped and have the effect of actually producing a wedging action and forcing the blades against their supporting projections, thereby having a very great retaining effect.

The blades are shown as provided with a pair of flutes but obviously they may have a cutting configuration consistent with any usual cutting implement desired to be used in this type of device. The number of blades may vary and the entire construction may be reversed to permit rotation for reaming in the opposite direction, in which event the inclination of the projections 22 and the finish of the cutting segments would all be designed for the purpose of permitting opposite rotation.

The retaining and adjusting nut 16 is obviously so positioned as to prevent the blades from expanding and furnishes an adjustment to assure that all of the blades are adjusted to the same position when they are retained against the annular bevel or like surface provided for overhanging and engaging the chamfered portion of the blades. To adjust the reamer the blades may be set slightly oversize, the screws 26 partly tightened and the rear adjusting nut 16 turned until the final desired adjustment is reached. The screws 26 are then tightened and will have the effect of holding the blades in adjusted position. If a larger adjustment is required, the adjusting nut 16 is backed off slightly, the wedge shaped blade retaining members slightly loosened and then the blades are forced by suitable means up against the blade engaging portion of the adjusting nut until proper adjustment is obtained. Under any and all circumstances the wedge shaped blade retaining members are tightened into position before an actual reaming operation and I have found that the wedging action produced is adequate to hold the blades in the desired position. Thus, it will be seen that the blades are held in position even at the very end of the shank without any overhang, so far as support on the shank is concerned, but still with sufficient rigidity to maintain the adjustment of the blades during usual reaming operations.

Those skilled in the art will understand that my invention is capable of many modifications without departing from the spirit and scope of the attached claims. In many instances, for example, it is unnecessary to employ both the lock nut 17 and adjusting nut 16; indeed, a nut equivalent to adjusting nut 16 may frequently be used to merely facilitate adjustment of the blades for size, but not relied upon for support.

When such a nut is removed, and the wedge shaped retaining member alone relied upon to support the segments during a reaming operation, chip clearance is facilitated. It should also be noted that the key-like connection between the blades and mandrel can be reversed; that is to say, the flat under surface of the blade can carry the projection, and the recess in which it is engaged may be in the blade supporting surfaces of the shank. The essential functions of the structure can, in either case, be performed, including that of causing pressure engagement of the blades against the flat area of the surface 21.

What I claim as new and desire to protect by Letters Patent of the United States is:

1. In a reamer, a shank having a plurality of tapered blade receiving surfaces, a plurality of blades on such surfaces, means forming a hook-like engagement between the shank and blades, said hook-like engagement being intermediate side edges of the blades, and wedge means along a side of each blade to force said blades in a direction to increase surface pressure at said hook-like engagement means and thereby force said blades against the shank.

2. In a reamer, a shank having a plurality of flat segment supporting surfaces, a rhombic shaped projection along each such surface, a blade on each such surface having a recess to receive one such projection, said projection and recess being intermediate side edges of the blade, whereby there is a hook-like driving engagement between the shank and blades, and wedge means secured to the shank for forcing a tighter contact at said hook-like engagement and thereby force said blades against the shank.

3. In a reamer, a shank having a plurality of flat surfaces, a rhombic shaped projection along each such surface, a blade on each such surface having a recess to receive one such projection, said projection and recess being intermediate side edges of the blade, whereby there is a hook-like driving engagement between the shank and blades, and wedge means secured to the shank for forcing a tighter contact at said hook-like engagement, said wedge means comprising a wedge shaped retainer secured to the shank and wedged between a surface on the shank and a side edge of the blade.

4. In a reamer, a shank having a plurality of flat surfaces, a rhombic shaped projection along each such surface, a blade on each such surface having a recess to receive one such projection, said projection and recess being intermediate side edges of the blade, whereby there is a hook-like driving engagement between the shank and blades, and wedge means secured to the shank for forcing a tighter contact at said hook-like engagement and against the shank, said wedge means comprising a wedge shaped retainer secured to the shank and wedged between a flat surface on the shank and a side edge of the blade, and an external annular retainer secured to the shank and engaging ends of the blades.

5. In a reamer, a shank having a plurality of flat surfaces, a rhombic shaped projection along each such surface, a blade on each such surface having a recess to receive one such projection, said projection and recess being intermediate side edges of the blade, whereby there is a hook-like driving engagement between the shank and blades, and wedge means secured to the shank for forcing a tighter contact at said hook-like engagement, said wedge means comprising a wedge shaped retainer secured to the shank and wedged between a flat surface on the shank and a side edge of the blade, and an external annular retainer secured to the shank and engaging beveled ends of the blades, said annular retainer engaging that end of the blades which will prevent expansion thereof.

6. In a reamer, a shank having a plurality of flat surfaces, a rhombic shaped projection along each such surface, a blade on each such surface having a recess to receive one such projection, whereby there is a hook-like driving engagement between the shank and blades, and wedge means secured to the shank for forcing a tighter contact at said hook-like engagement to thereby force the blades against the flat surfaces of the shank, and an external annular retainer secured to the shank and engaging beveled ends of the blades.

7. A metal removing tool comprising a mandrel, a metal removing segment the inner surface of which rests against the surface of said mandrel, said surfaces being flat and disposed at an angle to the axis of the mandrel for moving said segment outwardly of the axis as said surfaces slide upon each other, one of said surfaces having extending therefrom a hook-like projection and the other of said surfaces having depressed therefrom a hook-like depression, said projection and depression co-acting to drive said segment in a metal removing direction and to urge said surfaces toward each other, the outer surface of said segment presenting a plurality of metal removing edges, and wedge means secured to the mandrel and extending along one edge of said segment for maintaining said segment in adjusted position.

8. A metal removing tool comprising a mandrel having a plurality of substantially flat segment supporting surfaces, each such surface having a rhombic shaped projection intermediate its forward and rear edges and generally parallel thereto, the said rhombic shaped projections being inclined to the axis of rotation of the reamer, each segment supporting surface having a triangular projection on its forward face, one face of the projection forming a continuation of one such flat segment supporting surface and another running parallel to two of the surfaces of the rhombic projection, a cutting segment on each such supporting surface, each such segment having a recess to receive said rhombic projection in hook-like engagement and a substantially flat forward edge surface, and a wedge attached by screws to the mandrel and engaging between each such triangular projection and flat edge surface of a segment, to force the segment into contact with the rhombic projection and tightly against the flat supporting surface of the mandrel.

WILLIAM J. BLAZEK.

REFERENCES CITED

The following references are of record in the file of this patent:

UNITED STATES PATENTS

| Number | Name | Date |
|---|---|---|
| 1,166,716 | Riley et al. | Jan. 4, 1916 |
| 1,402,039 | Balle | Jan. 3, 1922 |
| 1,533,314 | Fox | Apr. 14, 1925 |
| 1,645,696 | Fritz | Oct. 18, 1927 |
| 1,740,647 | Daw | Dec. 24, 1929 |
| 2,421,490 | Evans | June 3, 1947 |